United States Patent
Narasimha et al.

(10) Patent No.: US 9,485,749 B2
(45) Date of Patent: Nov. 1, 2016

(54) IDLE STATE INTERFERENCE MITIGATION IN WIRELESS COMMUNICATION NETWORK

(75) Inventors: Murali Narasimha, Lake Zurich, IL (US); Sandeep H. Krishnamurthy, Sunnyvale, CA (US); Ravi Kuchibhotla, Gurnee, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 809 days.

(21) Appl. No.: 13/288,643

(22) Filed: Nov. 3, 2011

(65) Prior Publication Data

US 2012/0115485 A1    May 10, 2012

Related U.S. Application Data

(60) Provisional application No. 61/412,377, filed on Nov. 10, 2010.

(51) Int. Cl.
| | | |
|---|---|---|
| H04W 36/00 | (2009.01) | |
| H04W 68/02 | (2009.01) | |
| H04W 16/16 | (2009.01) | |
| H04W 84/04 | (2009.01) | |

(52) U.S. Cl.
CPC ............. *H04W 68/02* (2013.01); *H04W 16/16* (2013.01); *H04W 84/045* (2013.01)

(58) Field of Classification Search
CPC .................................................. H04W 68/02
USPC .......................................... 455/436; 370/338
See application file for complete search history.

(56) References Cited

U.S. PATENT DOCUMENTS

| | | | |
|---|---|---|---|
| 6,321,090 B1* | 11/2001 | Soliman ...................... 455/440 |
| 2009/0182871 A1 | 7/2009 | Gupta et al. | |
| 2010/0035615 A1 | 2/2010 | Kitazoe et al. | |
| 2010/0159929 A1 | 6/2010 | Homchaudhuri | |
| 2010/0197301 A1* | 8/2010 | Islam et al. ............... 455/434 |
| 2010/0279693 A1* | 11/2010 | Hole ....................... 455/436 |
| 2010/0323610 A1 | 12/2010 | Li et al. | |
| 2011/0053617 A1 | 3/2011 | Lee et al. | |
| 2011/0076960 A1 | 3/2011 | Yun et al. | |
| 2011/0080896 A1 | 4/2011 | Krishnamurthy | |

(Continued)

FOREIGN PATENT DOCUMENTS

| | | |
|---|---|---|
| WO | 2009099362 A1 | 8/2009 |
| WO | 2010147405 A2 | 12/2010 |

OTHER PUBLICATIONS

Lopez-Pérez et al., "Enhanced Intercell Interference Coordination Challenges in Heterogeneous Networks" IEEE Wireless Communications, Jun. 2011, pp. 22-30.

(Continued)

*Primary Examiner* — Marcos Batista
(74) *Attorney, Agent, or Firm* — Faegre Baker Daniels LLP

(57) ABSTRACT

A method in a mobile station for ranking cells in order to perform reselection from a serving cell to a second cell is disclosed. The method includes detecting a second cell that the mobile station is not allowed to access, determining resources used for transmission of a signal of the second cell, and applying a reselection bias if the resources used for transmission of the signal of the second cell do not substantially overlap resources used for transmission of a signal of the serving cell.

12 Claims, 11 Drawing Sheets

(56) References Cited

U.S. PATENT DOCUMENTS

2011/0110251 A1 5/2011 Krishnamurthy
2012/0057480 A1 3/2012 Yoo et al.

OTHER PUBLICATIONS

3GPP TSG RAN WG2 #72, R2-106473 "eICIC Idle mode considerations" Motorola, Jacksonville, USA, Nov. 15-19, 2010, 3 pages.

Patent Cooperation Treaty, International Search Report and Written Opinion of the International Searching Authority for International Application No. PCT/US2011/059324, Dec. 22, 2011, 15 pages.

State Intellectual Property Office of the People's Republic of China, Notification of First Office Action for Chinese Patent Application No. 201180054306.X (related to above-captioned patent application), mailed May 6, 2015.

New Postcom, "Resource-specific measurement in Idle Mode for eICIC," 3GPP TSG RAN WG2 Meeting #73, R2-106171, Nov. 15-19, 2010.

* cited by examiner

IDLE STATE INTERFERENCE MITIGATION IN WIRELESS COMMUNICATION NETWORK

CROSS-REFERENCE TO RELATED APPLLICATIONS

The present application claims benefits to provisional Application No. 61/421,377 filed on 10 Nov. 2010, the contents of which are incorporated herein by reference.

FIELD OF THE DISCLOSURE

The present disclosure relates generally to wireless communications, interference management and interference reduction in wireless networks.

BACKGROUND

Wireless communication networks are well known. Some networks are completely proprietary, while others are subject to one or more standards to allow various vendors to manufacture equipment for a common system. One such standards-based network is the Universal Mobile Telecommunications System (UMTS). UMTS is standardized by the Third Generation Partnership Project (3GPP), a collaboration between groups of telecommunications associations to make a globally applicable third generation (3G) mobile phone system specification within the scope of the International Mobile Telecommunications-2000 project of the International Telecommunication Union (ITU). Efforts are currently underway to develop an evolved UMTS standard, which is typically referred to as UMTS Long Term Evolution (E-UTRA) or Evolved UMTS Terrestrial Radio Access (E-UTRA).

According to Release 8 of the E-UTRA or LTE standard or specification, downlink communications from a base station (referred to as an "enhanced Node-B" or simply "eNB") to a wireless communication device (referred to as "user equipment" or "UE") utilize orthogonal frequency division multiplexing (OFDM). In OFDM, orthogonal subcarriers are modulated with a digital stream, which may include data, control information, or other information, so as to form a set of OFDM symbols. The subcarriers may be contiguous or discontiguous and the downlink data modulation may be performed using quadrature phase shift-keying (QPSK), 16-ary quadrature amplitude modulation (16QAM), or 64QAM. The OFDM symbols are configured into a downlink subframe for transmission from the base station. Each OFDM symbol has a time duration and is associated with a cyclic prefix (CP). A cyclic prefix is essentially a guard period between successive OFDM symbols in a subframe. According to the E-UTRA specification, a normal cyclic prefix is about five (5) microseconds and an extended cyclic prefix is 16.67 microseconds.

In contrast to the downlink, uplink communications from the UE to the eNB utilize single-carrier frequency division multiple access (SC-FDMA) according to the E-UTRA standard. In SC-FDMA, block transmission of QAM data symbols is performed by first discrete Fourier transform (DFT)-spreading (or precoding) followed by subcarrier mapping to a conventional OFDM modulator. The use of DFT precoding allows a moderate cubic metric/peak-to-average power ratio (PAPR) leading to reduced cost, size and power consumption of the UE power amplifier. In accordance with SC-FDMA, each subcarrier used for uplink transmission includes information for all the transmitted modulated signals, with the input data stream being spread over them. The data transmission in the uplink is controlled by the eNB, involving transmission of scheduling requests (and scheduling information) sent via downlink control channels. Scheduling grants for uplink transmissions are provided by the eNB on the downlink and include, among other things, a resource allocation (e.g., a resource block size per one millisecond (ms) interval) and an identification of the modulation to be used for the uplink transmissions. With the addition of higher-order modulation and adaptive modulation and coding (AMC), large spectral efficiency is possible by scheduling users with favorable channel conditions.

E-UTRA systems also facilitate the use of multiple input and multiple output (MIMO) antenna systems on the downlink to increase capacity. As is known, MIMO antenna systems are employed at the eNB through use of multiple transmit antennas and at the UE through use of multiple receive antennas. A UE may rely on a pilot or reference symbol (RS) sent from the eNB for channel estimation, subsequent data demodulation, and link quality measurement for reporting. The link quality measurements for feedback may include such spatial parameters as rank indicator, or the number of data streams sent on the same resources; precoding matrix index (PMI); rank indicator (RI) and coding parameters, such as a modulation and coding scheme (MCS) or a channel quality indicator (CQI). Together MCS or CQI, PMI and RI constitute elements of the Channel State Information (CSI) which convey the quality of MIMO channel indicative of the reliability and condition number of the channel capable of supporting multi-stream communication between the eNB and the UE. For example, if a UE determines that the link can support a rank greater than one, it may report multiple CQI values (e.g., two CQI values when rank=2 by signaling of the corresponding RI). Further, the link quality measurements may be reported on a periodic or aperiodic basis, as instructed by an eNB, in one of the supported feedback modes. The reports may include wideband or subband frequency selective information of the parameters. The eNB may use the rank information, the CQI, and other parameters, such as uplink quality information, to serve the UE on the uplink and downlink channels.

E-UTRA systems must be compliant to regulatory requirements on spurious emissions on licensed bands in different regions of the world. E-UTRA follows the "uplink after downlink" principle which means that a UE must transmit on its uplink only when its downlink is reliable. In other words, a UE that does not have a reliable downlink must continuously monitor the quality of the downlink signal by tracking the downlink signal quality (e.g., based on channel state estimation) and stop transmission on its uplink if the downlink signal quality falls below a threshold. In E-UTRA, this is enabled by means of Radio Link Monitoring (RLM) UE procedures where a UE continuous monitors the cell-specific reference signal (CRS) on the downlink and determines the channel state (including estimating the propagation channel between the eNB and the UE and the underlying interference on the same carrier). Qout is defined as the condition that the channel quality between eNB and the UE is such that the Block Error Rate (BLER) of a first hypothetical control channel transmission exceeds 10%. This event is also denoted as an "out-of-sync" event. Qin is defined as the condition that the channel quality between eNB and the UE is such that the BLER of a second hypothetical control channel transmission drops below 2%. This event is also denoted as an "in-sync" event. The UE monitors the channel state in RRC_CONNECTED mode continuously or periodically in both non-discontinuous reception (non-DRX) and discontinuous reception (DRX) states to evaluate whether Qout or Qin has occurred. Upon several successive Qout detections, the UE must determine that a Radio Link Problem (RLP) has occurred. In the RLP state, the UE must assume that it has lost its downlink with the serving eNB and start monitoring the link for recovery. If a Qin is detected within a certain duration of time as configured by the eNB by means of a Radio Resource Control (RRC) timer, the UE resumes normal RRC_CONNECTED operation. On the other hand, if a Qin is not detected within the said duration of time, the UE must determine that a Radio Link Failure (RLF) has occurred and must stop all uplink transmission within 40 ms. The RLM procedure reduces the probability that a UE jams the uplink of a neighbor cell when the UE has lost the serving cell downlink but has not been handed over to a different cell by the network due to Radio Resource Management (RRM) inefficiencies.

Like other 3GPP standards, E-UTRA supports mobility of UEs by RRM measurements and associated support for RRC signaling including specified eNB and UE behavior in both RRC_CONNECTED and RRC_IDLE states. In the RRC_CONNECTED state, a UE can be configured to measure and report Reference Signal Received Power (RSRP) and Reference Signal Received Quality (RSRQ) for both the serving cell and the neighbor cells (on the serving cell carrier and inter-frequency carriers). A network element such as the eNB or the Mobility Management Entity (MME) can perform UE handovers based on the reported measurements. In RRC_IDLE state, the UE can be configured to measure RSRP and RSRQ and perform cell reselections based on these measurements.

Heterogeneous networks comprise a variety of base stations serving mobile stations. The base stations can operate on the same carrier frequency. The variety of base stations can include some or all of the following types of base stations: conventional macro base stations (also referred to as macro cells), pico base station (or pico cells), relay nodes and femto base stations (also referred to as femto cells, CSG cells or Home eNodeBs). Macro cells typically have coverage areas that range from several hundreds of meters to several kilometers. Pico cells, relays and femto cells can have coverage areas that are considerably smaller than the coverage area of typical macro cells. Pico cells can have coverage areas of about 100-200 meters. Femto cells are typically used for indoor coverage, and can have coverage areas in the 10s of meters. Relay nodes are characterized by a wireless backhaul to a donor base station, and can have coverage areas similar to pico cells.

Heterogeneous networks can potentially enable an operator to provide improved service to users (e.g., increased data rates, faster access, etc) with lower capital expenditure. Typically, installation of macro base stations is very expensive as they require towers. On the other hand base stations with smaller coverage areas are generally much less expensive to install. For example, pico base stations can be installed on roof tops and femto base stations can be easily installed indoors. The pico and femto base stations allow the network to offload user communication traffic from the macro cell to the pico or femto cells. This can enable the users to get higher throughput and better service without the network operator installing additional macro base stations or provisioning more carrier frequencies for communication. Thus, heterogeneous networks are considered to be an attractive path for evolution of wireless communication networks. 3GPP has commenced work on enabling heterogeneous LTE networks in 3GPP LTE Release 10.

Currently, the existing Rel-8/9 UE measurement framework can be made use of to identify the situation when this interference might occur and the network can handover the UE to an inter-frequency carrier which is not shared between macro-cells and HeNBs to mitigate this problem. However, there might not be any such carriers available in certain networks to handover the UE to. Further, as the penetration of HeNBs increases, being able to efficiently operate HeNBs on the entire available spectrum might be desirable for maximizing spectral efficiency and reducing overall operational cost. Several other scenarios are likely too including the case of a UE connected one HeNB experiencing interference from an adjacent HeNB or a macro cell. The following types of interference scenarios have been identified.

HeNB (aggressor)→MeNB (victim) downlink (DL)
HUE (aggressor)→MeNB (victim) uplink (UL)
MUE (aggressor)→HeNB (victim) UL
MeNB (aggressor)→HeNB (victim) DL
HeNB (aggressor)→HeNB (victim) on DL
HeNB (aggressor)→HeNB (victim) on UL.

FIG. 1 illustrates an LTE Heterogeneous network comprising a macro cell, pico cells and femto cells operating on a single carrier frequency. A mobile station (also referred to as "user equipment" or 'UE") may be associated with one of the cells based on its location. The association of a UE to a cell can refer to association in idle mode or connected mode. That is, a UE is considered to be associated with a cell in idle mode if it is camped on the cell in idle mode. Similarly, a UE is considered to be associated with a cell in connected mode if it is configured to perform bi-directional communication with a cell (for example, a UE in LTE RRC connected mode can be connected to, and therefore associated with a cell). A UE associated with a macro cell is referred to macro UE; a UE associated with a pico cell is referred to as a pico UE; and a UE associated with a femto cell is referred to as a femto UE.

Various time-division approaches are possible for ensuring that the base stations in a heterogeneous network share the frequency spectrum while minimizing interference. Two approaches can be envisioned:

A network can configure time periods where different base stations are required to not transmit. This enables cells that can interfere with one another to transmit in mutually exclusive time periods. For example, a femto cell can be configured with some time periods during which it does not transmit. If a macro UE is located within the coverage of the femto cell, the macro cell can use the time periods during which the femto cell does not transmit to transmit data to the UE.

The network can configure time periods where a first base station transmits on all available time periods (e.g., pico eNBs), while a second base station (e.g., macro eNB) transmits only on subset of the available time periods. A UE connected to the first base station can therefore have two "virtual" channels at different channel qualities depending on how much the second base station's transmission interferences with that for the first (i.e., signal geometry of the first base station relative to the second). The first virtual channel is where only the first base station transmits data while the second base station does not transmit data. The second virtual channel is one where both the first and the second base stations transmit data. The first base station can use adaptive modulation and coding and schedule at different MCS levels on the two virtual channels (in the extreme case, not schedule at all on the second virtual channel when the interference from the second base station is large.)

However, it should be noted that the time division approaches can lead to various problems for UEs in idle mode, some of which are listed below:

A UE in idle mode expects to receive paging messages from a serving cell in certain predefined time periods that occur periodically. When the paging time periods overlap the time periods when a strong neighbor cell transmits data, the UE may be unable to receive paging messages.

The cell specific reference symbol (CRS) transmissions of the serving cell may overlap the CRS of a strong neighbor cell. This can result in the UE being unable to perform correct measurements of the serving cell and the neighbor cell.

The physical broadcast channel (PBCH) transmission of the serving cell may overlap the PBCH transmission of a strong neighbor cell, resulting in the UE being unable to decode the PBCH of the serving cell. This can the result in the UE not having up to date system information of the serving cell, as well as other undesirable consequences.

The primary synchronization signal (PSS) and secondary synchronization signal (SSS) of the serving cell may overlap the PSS and the SSS of a strong neighbor cell respectively. This can result in the UE not being able to remain synchronized to the serving cell.

Therefore, methods to overcome the problems in idle mode UEs resulting from the use of time division approaches are needed.

DETAILED DESCRIPTION

Figure 1:
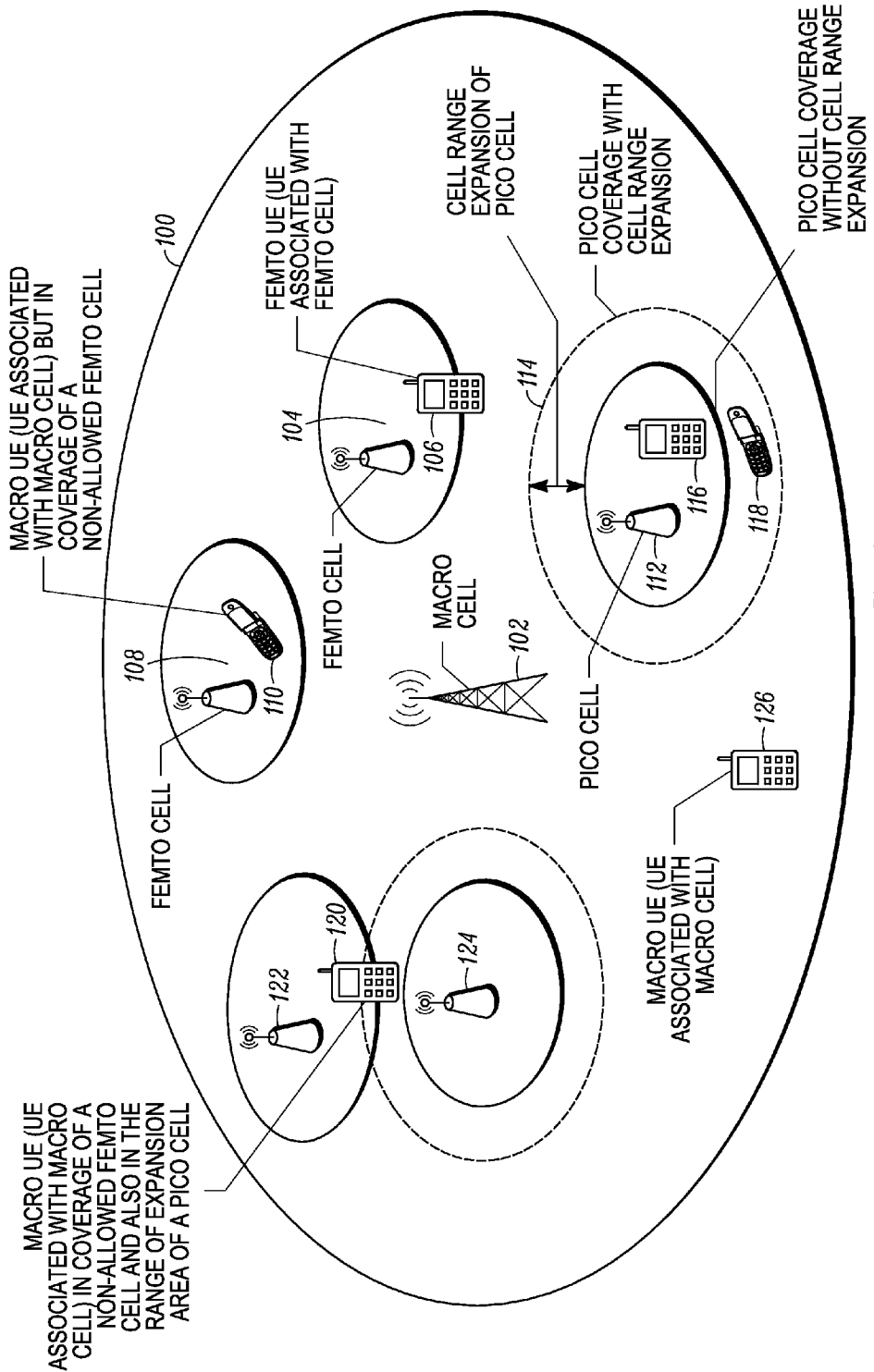
FIG. 1 illustrates an example of a Heterogeneous network comprising macro cells, pico cells and femto cells.

Femto cells are generally used in homes and offices and their precise location and configuration is not entirely under the network operator's control. For example, two femto cells located in nearby homes can have the same physical layer cell identifier (PCID). A femto cell can be a restricted access cell such as a Closed Subscriber Group (CSG) cell. FIG. 1 illustrates an example of Heterogeneous network (100) comprising a macro cell (102), femto cells (104, 108, 122), pico cells (112, 124) and mobile stations (106, 110, 116, 118, 120, 126). If a UE (110) is not a member of the CSG to which the femto cell (108) belongs, the UE may be unable to access the femto cell. Even if the UE (110) is very close to such a femto cell (108), the UE may be associated with the macro cell. The UE may then experience significant interference to its communication with the macro cell due to transmissions of the femto cell.

Pico cells generally do not restrict access to specific users. However, some operator configurations can allow pico cells to restrict access to certain users. Pico cells are generally fully under the network operator's control and can be used to enhance coverage in locations where the macro cell signal may be inadequate. Furthermore, in order to maximize offloading of users to pico cells, a network operator can have an association bias towards the pico cell. That is, a UE (118) is made to associate with a pico cell even if the pico cell (112) is not the strongest cell at the UE's (118) location. This is referred to as "Cell range expansion" of the pico cell. A UE is said to be the cell range expansion area of a pico cell, if it associates with the pico cell only if an association bias is used, and associates with another cell (e.g., a macro cell 102) if the association bias is not used. If a UE (118) is in the cell range expansion area of the pico cell (112) and is associated with the pico cell (112), it can experience significant interference due to transmissions of a neighbor cell (such as a macro cell 102).

In order to operate multiple cells with overlapping coverage on a carrier frequency, such as in a heterogeneous network 100, it is necessary to have coordination between the cells so that the transmissions don't interfere with one another. LTE heterogeneous networks will use time division techniques to minimize interference. Specifically, a cell can be configured with patterns of subframes during which it does not schedule user data. Such subframes are referred to as "Blank subframes". Furthermore, it may be necessary to transmit some critically important information in all subframes. For example, it may be necessary to transmit cell-specific reference symbols (CRS) to enable UEs to perform measurements during the subframe. It may also be necessary to transmit primary and secondary synchronization signals (PSS and SSS), primary broadcast channel (PBCH) and System Information Block 1 (SIB1), Paging Channel and the Positioning Reference Signal (PRS). Such information is essential for proper operation of functions such as cell search and maintenance of up-to-date system information. Blank subframes which are not used for scheduling data but can be used for transmission of a restricted set of information (such as the critically important information described above) are referred to as "Almost blank subframes" (AB subframes). In LTE AB subframes of a base station, the base station can be configured to not transmit any energy on all resource elements, except for resource elements used for (a) CRS, (b) PSS and SSS, (c) PBCH, (d) SIB1, e) paging messages, and (e) Positioning Reference Signal (PRS). There may be other signals such as Channel State Information Reference Signal (CSI-RS) in the AB subframes.

Figure 2:
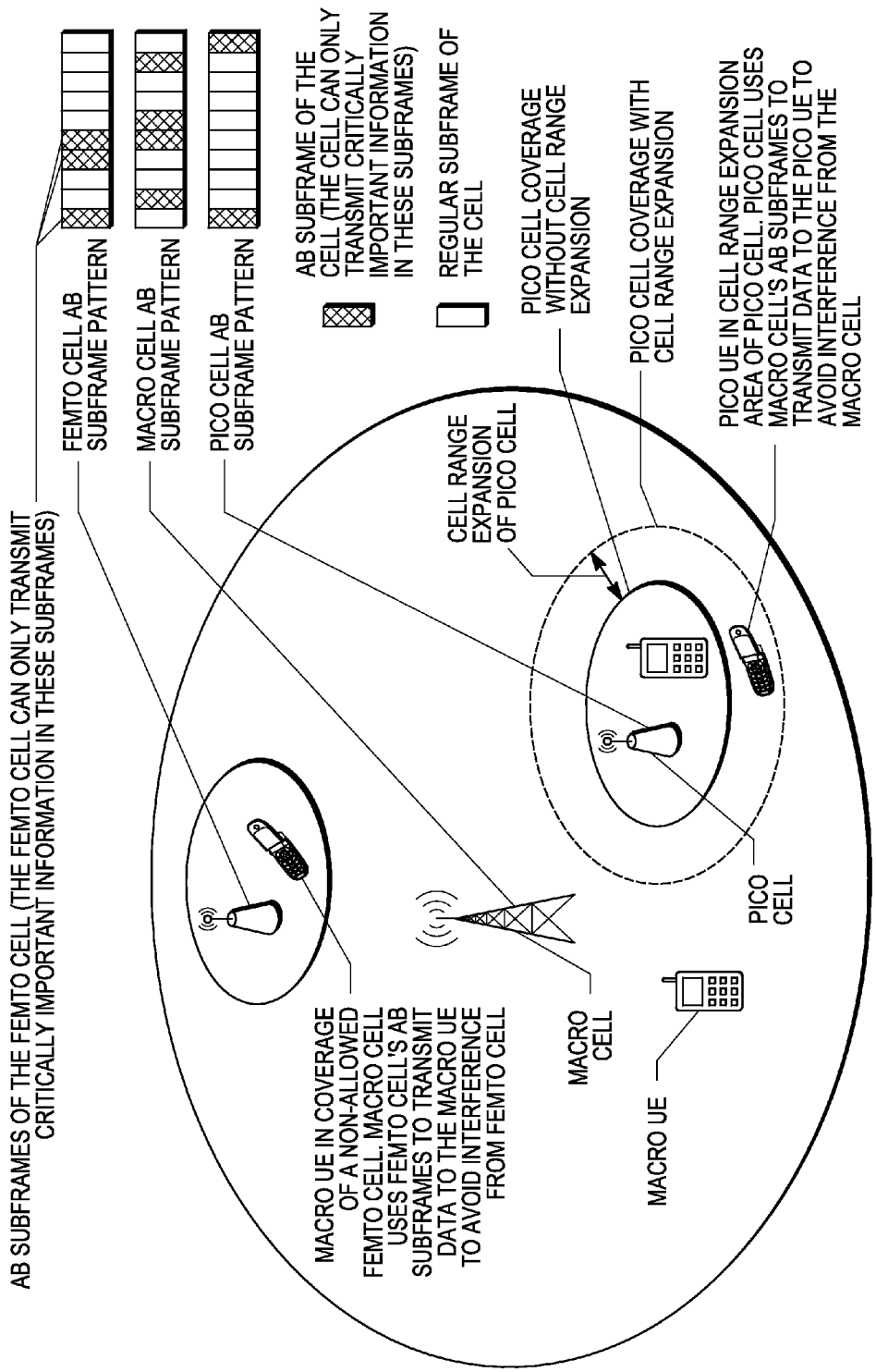
FIG. 2 illustrates the application of almost blank subframes for scheduling UEs in a heterogeneous network.

AB subframes of one cell can be used by a neighboring cell to schedule UEs. FIG. 2 illustrates the use of AB subframes. For example, each of a femto cell, a macro cell and a pico cell can be configured with an AB subframe pattern. The patterns can be such that the AB subframes of different cells can overlap. Alternatively the patterns can be mutually exclusive, so that AB subframes of two cells do not overlap. Also, some cells may not be configured with an AB subframe pattern. As indicated above, a cell can be configured to only transmit critically important information during its AB subframes.

We further illustrate the use of AB subframe patterns. A macro UE may be in the coverage of a non-allowed femto cell (such as a CSG cell whose CSG the UE is not a member). UE 110 represents such a UE and femto cell 108 represents such a femto cell. Such a macro UE can experience very high interference from the femto cell, making communication between the macro UE and the macro cell very difficult. To overcome the interference, the macro cell can transmit data to the UE only in the AB subframes of the femto cell. Since the femto cell only transmits critically important signals in the AB subframes, the macro cell can avoid most of the interference from the femto cell and successfully transmit data to the macro UE in the AB subframes of the femto cell.

Similarly, a pico UE may be in the cell range expansion area of the pico cell. UE 118 represents such a pico UE and pico cell 112 represents such a pico cell. Such a pico UE can experience a very high interference from a neighbor cell (such as macro cell 102), making communication between the pico UE and the pico cell very difficult. In order to overcome the interference, the pico cell can transmit data to the UE only in the AB subframes of the macro cell. Since the macro cell only transmits critically important signals in the AB subframes, the pico cell can avoid most of the interference from the macro cell and successfully transmit data to the pico UE in the AB subframes of the macro cell.

When different cells use different patterns of AB subframes, the RRM, RLM and CSI measurements performed by UEs in the heterogeneous network can result in unpredictable and undesirable behavior. UEs perform RLM measurements in connected mode to ensure that the serving cell signal conditions are adequate to schedule the UE. UEs perform RRM measurements to support handovers in connected mode and reselections in idle mode. Furthermore, UEs can perform RRM measurements in idle mode to support idle mode mobility (i.e., cell selection and cell reselection). UE performs CSI measurements to support optimal scheduling by the base station. For example, macro UE 110 in the coverage of a non-allowed femto cell 108 may be performing RLM measurements of the macro cell 102 signal. Due to interference from the femto cell 108 in subframes during which the femto cell schedules (i.e., not the AB subframes of the femto cell), the macro UE can conclude that the radio link between the macro cell and the macro UE has failed. The UE can make such a conclusion even if it can be successfully scheduled by the macro cell during the AB subframes of the femto cell.

Similarly, the macro UE 110 in the coverage of a non-allowed femto cell 108 may be performing RRM measurements of the serving cell and neighbor cells. Due to interference from the femto cell, the UE may measure a low value the macro cell signal level and transmit a measurement report indicating the low value to the network. As a result of the measurement report, the network can perform a handover of the UE to another frequency or to another radio access technology (such as UMTS or GSM). This is an undesirable outcome, as the UE can be successfully scheduled by the macro cell in the femto cell's AB subframes. Alternatively, if the UE is in idle mode, it can perform a reselection to a cell on another frequency or RAT, based on the low value of the macro signal level. This is also an undesirable outcome, as the UE can remain associated with the macro cell in idle mode.

Figure 3:
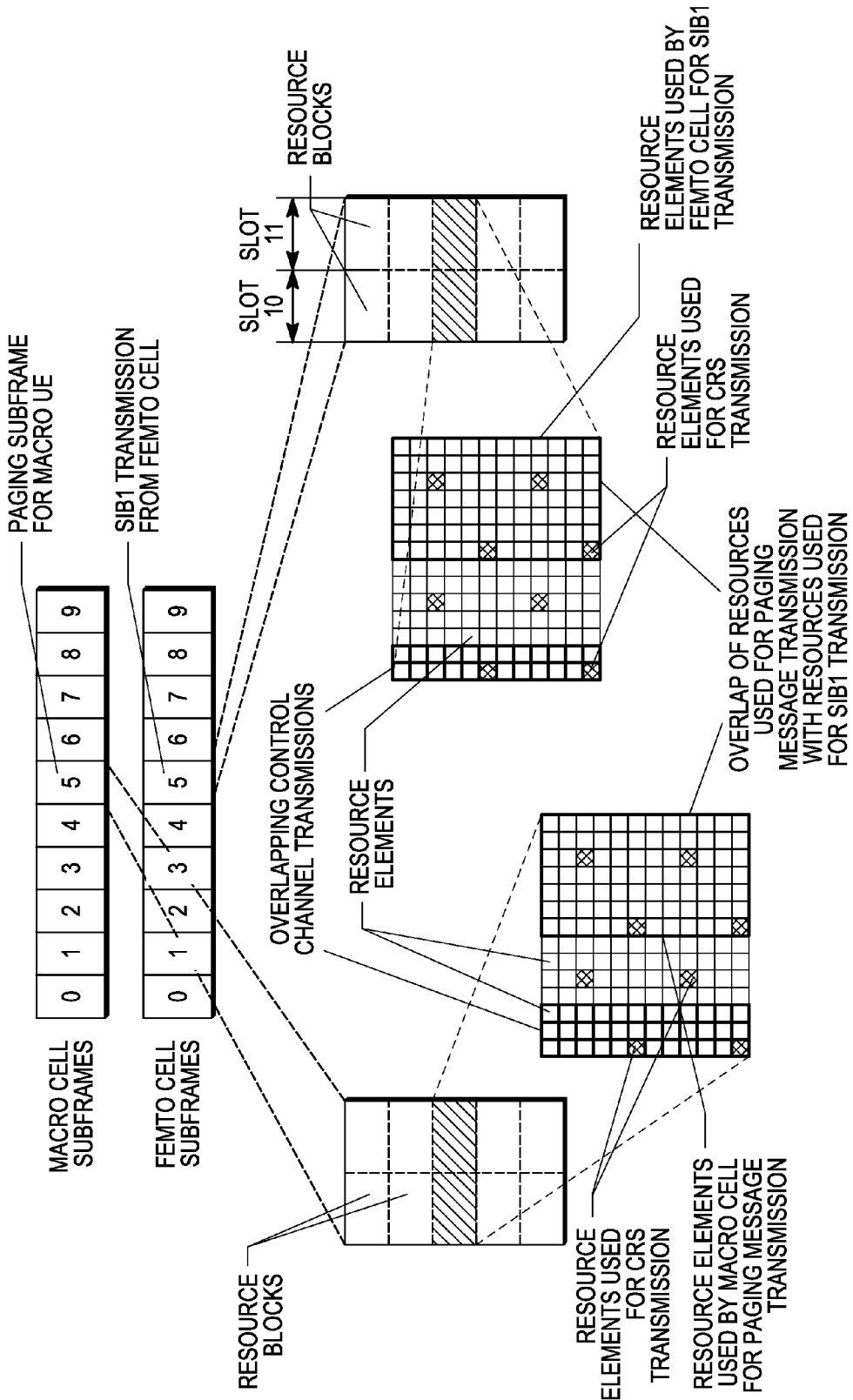
FIG. 3 illustrates problems related to paging UEs in a heterogeneous network.

Problems related to paging channel reception by UEs in heterogeneous networks are illustrated in FIG. 3. The paging signal can comprise two components as described below.

A control channel signal indicating the Resource Allocation (RA) corresponding to the data channel carrying the paging message. In 3GPP LTE, the control channel can be a physical downlink control channel (PDCCH) and the data channel can be a physical downlink shared channel (PDSCH). Furthermore, a specific control channel format can be used for signaling a data channel carrying the paging message. For example, a PDCCH with a Downlink Control Information (DCI) format 1A or 1C as per specifications TS 36.212 and TS 36.213 may be used for indicating a PDSCH carrying a paging message. The DCI is convolutionally coded and the codeword is scrambled with Paging Radio Network Transaction Identifier (P-RNTI) prior to transmission. The paging message can include information indicating a page for one or more UEs and can also include an indication that a change of broadcast system information of the base station is impending.

The paging signal can be transmitted only during a pre-determined set of subframes. Based on its UE identifier, a UE determines a paging subframe using a specified formula, during which it can receive paging signals. The subframe determined based on the UE identifier is referred to as the UE's paging occasion or the UE's paging subframe. Details of determining the paging occasion for LTE UEs are specified in TS 36.304. This mechanism enables the paging load to be distributed across the predetermined set of subframes used for paging, while still ensuring that the base station and the UE have a singular understanding of the UE's paging occasion.

A UE may fail to decode the paging signal in the following two scenarios:

A UE cannot successfully decode the DCI embedded in the PDCCH signal and therefore, fails to determine that there is a PDSCH transmission associated with the paging signal.

A UE successfully decodes DCI and determines the resource allocation for the PDSCH, but it fails to decode the Transport Blocks (TB) in the PDSCH transmission.

Both of these events lead to a paging failure. If the paging eNB does not receive a paging response message from the UE within a certain duration of the time following the paging signal transmission, the eNB may re-page the UE by a re-transmission of the paging signal in the next PO. If the UE cannot decode the paging signal successfully after several paging attempts, this may lead to a severe paging failure as the eNB may abandon further paging attempts. In a heterogeneous network, such paging failures are likely due to interfering transmissions from neighboring base stations. That is, if the UE is associated with a first cell when a second cell is a strong interferer, transmissions from the second cell can cause the UE to be unable to receive its paging signals. The UE is then said to be in a paging outage condition.

In LTE, the predetermined set of subframes used for paging transmission (the paging subframes of the cell) are restricted to subframes 0, 4, 5 and 9 in FDD and subframes 0, 1, 5 and 6 in TDD. It may be possible to ensure that the paging subframes of one cell coincide with AB subframes of a neighbor cell that may pose interference problem. For example, a femto cell in a TDD network may configure subframes 0, 1, 5 and 6 to be AB subframes. However, even in this case, it may not be possible to avoid the neighbor cell signal transmissions. This is because the (1) the neighbor cell transmits CRS during AB subframes, and (2) the neighbor cell transmits critically important signals such as PSS, SSS, PBCH, SIB1, paging signals, PRS and CSI-RS during AB subframes. Note that the SIB1 signal includes a PDCCH component and a PDSCH component; consequently the PDCCH component of the SIB1 signal from a neighbor cell can interfere with a PDCCH component of the paging signal from the serving cell to a UE (as shown in FIG. 3), resulting in a paging failure.

Figure 4:
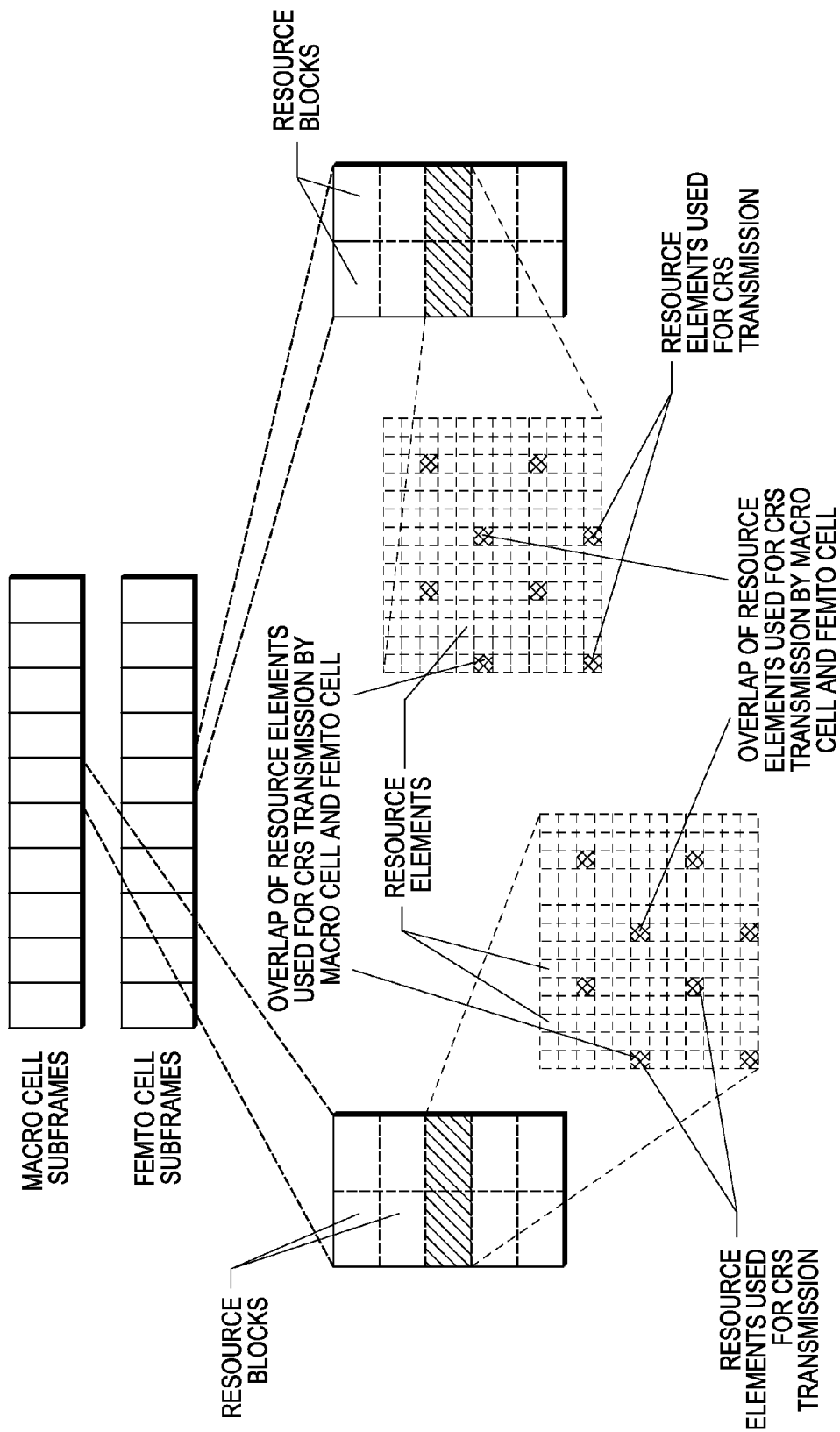
FIG. 4 illustrates problems related to overlap or collision of cell-specific reference symbols of different cells in a heterogeneous network.

Problems related to interference from CRS transmissions and interference to CRS transmissions are illustrated in FIG. 4. The following interference scenarios must be considered in a heterogeneous network.

Neighbor cell CRS interference to serving cell CRS
Neighbor cell CRS interference to serving cell PDCCH
Neighbor cell PDCCH interference to serving cell PDCCH
Neighbor cell PDCCH interference to serving cell PDSCH
Neighbor cell PDSCH interference to serving cell PDCCH
Neighbor cell PDSCH interference to serving cell PDSCH.

A first cell and a neighbor cell of the first cell can select PCID such that the CRS resource elements are substantially non-ovelapping. This PCID planning where serving cell and neighbor cell use substantially different CRS frequency offsets leading to non-overlapping CRS can mitigate problem (i) above. However, this scheme can lead to problem (ii) which cannot be avoided. Also problem (iii) is not possible to avoid due to the dependence of codeword to RE mapping on the sub-block interleaver and PCID. By configuring the number of symbols used for control channel transmissions of the neighbor cell to be smaller than the number of symbols used for control channel transmissions of the serving cell, it is possible to reduce the impact of (iv). However, such an approach may be difficult to use in a heterogeneous network comprising macro cells, pico cells and femto cells. Moreover, such a restriction leads to not being able to avoid problem (v) (e.g., SIB1 transmission from a femto cell can interfere with macro cell's PDCCH in a paging subframe). Problem (vi) can be avoided by frequency domain orthogonalization where the serving and neighbor cells use non-overlapping RBs and this can be achieved by network planning.

In summary, interference mitigation methods at the very least must address problems (i), (ii), (iii) and (iv).

In particular, for TDD deployments and synchronous FDD deployments, the frame time is aligned for all base stations within a geographical area. If a macro UE roams close to a CSG femto cell, femto cell's PDCCH/PDSCH associated with SIB1 in subframe 5 can interfere with paging messages for such macro UEs. A similar problem can arise for a pico UE in the range expansion area of a pico cell, due to the macro cell's SIB1 transmission. The interference can be large enough to result in increased paging failures or to result in a paging outage.

Figure 5:
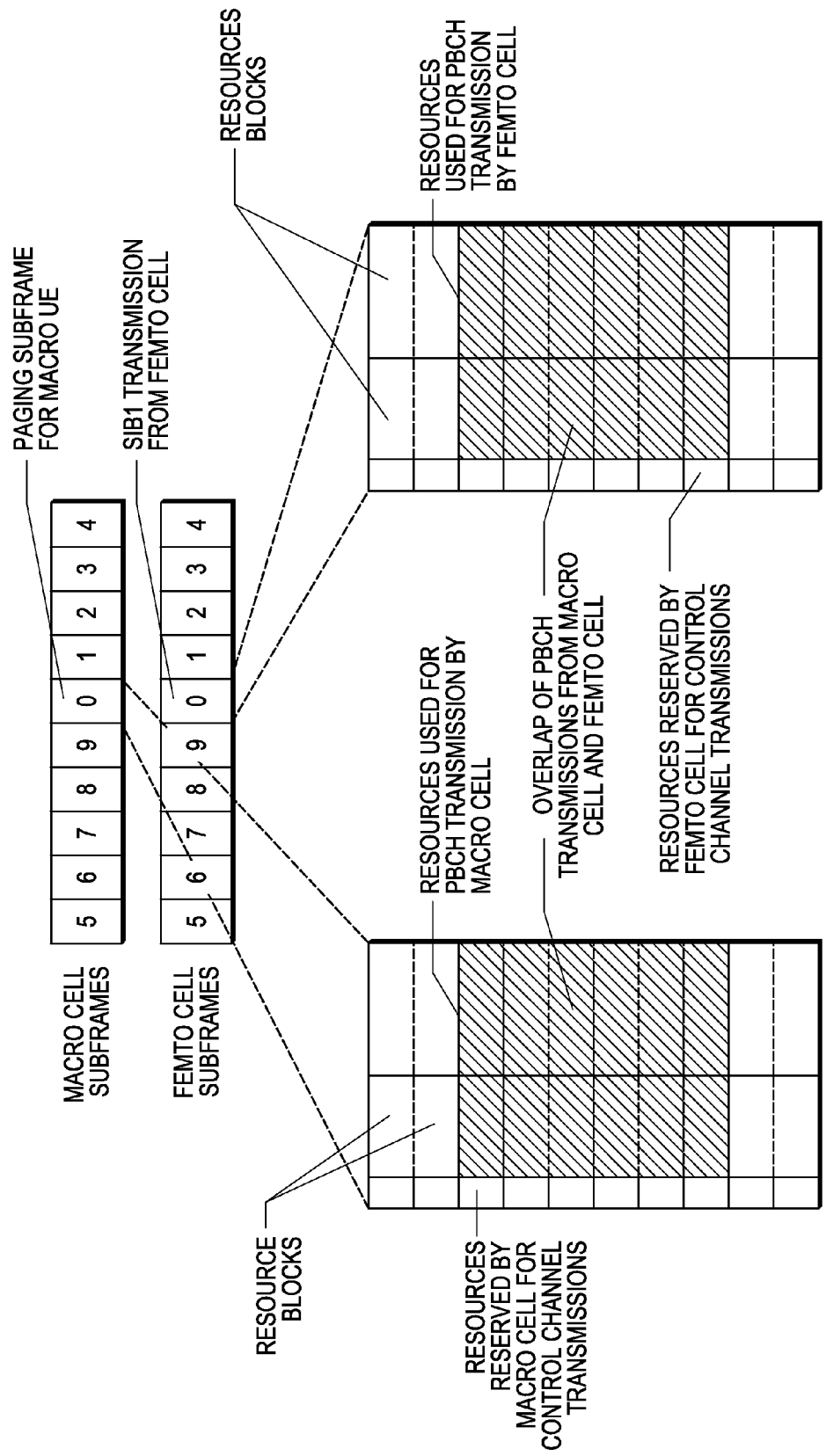
FIG. 5 illustrates problems related to overlap or collision of physical broadcast channels of different cells in a heterogeneous network.

FIG. 5 illustrates problems related to overlap of PBCH transmissions from neighboring cells. The PBCH delivers the Master information block (MIB), which is a fundamental component of the cell's broadcast system information. The MIB indicates essential information for system operation (such a operating bandwidth, system frame number, number of antennas used, etc). The UE needs to successfully decode the PBCH and use the information contained in the MIB to receive other parts of the system information such as SIB1, SIB2 (system information block 2) etc. A UE is expected to maintain up-to-date system information of a serving cell. Changes in broadcast system information of the cell are indicated in paging messages, wherein an indication that a system information change is impending is transmitted. Upon receiving an indication that a system information change is impending, the UE decodes the PBCH in a predefined time interval and then goes on to receive other system information. The PBCH is transmitted using fixed resources. In LTE, the PBCH is transmitted in the center 6 resource blocks of every subframe 0.

In a heterogeneous network, since cells operating on a frequency are synchronized, PBCHs of neighbor cells can overlap. This can lead to UEs being unable to decode the PBCH and being unable to maintain up-to-date system information. For example, if a macro UE is under the coverage of a non-allowed femto cell, the PBCH transmissions of the non-allowed femto cell can overlap the PBCH transmissions of a macro cell the UE is associated with. The UE can then be unable to decode the PBCH of the macro cell. A similar problem can occur when a pico UE is in the range expansion area of a pico cell the UE is associated with, and also in the coverage of a macro cell. In this situation, the UE can be unable to receive the PBCH of the pico cell. In an FDD system, a time offset can be applied by some cells on a frequency while still maintaining time synchronization and alignment of subframe boundaries across all cells on the frequency. Such a time offset is referred to as a subframe offset. A subframe offset can avoid the problem of overlapping PBCH transmissions between different cells on a frequency. However, a subframe offset cannot be applied in TDD systems, due to rigidly defined patterns of subframes that are used for uplink and downlink transmissions.

Problems related to the overlap of PSS and SSS transmissions from neighbor cells in a frequency can also result in significant problems for UEs in idle mode. As in the case of the PBCH, the PSS and the SSS are transmitted using predefined resources. In an FDD LTE system, the PSS is transmitted in the last symbol in slots 0 and 10 and in a TDD LTE system it is transmitted in the 3rd symbol in subframes 1 and 6. In an LTE FDD system, the SSS is transmitted two symbols before the last symbol in slots 0 and 10 and in a TDD LTE system it is transmitted the penultimate symbol in slots 1 and 11. The PSS and the SSS are used by UEs to remain synchronized to the serving cell and to identify cells. The PSS and SSS together indicate the PCID. Therefore being able to reliably receive the PSS and the SSS is crucial to proper system operation.

If a UE is in the coverage of a femto cell, the PSS and SSS transmissions from the femto cell can interfere with the PSS and SSS transmissions of a macro cell operating on the same frequency. Consequently, the UE may be unable to remain synchronized to the macro cell. This can result in service outage, paging failures and other undesirable consequences. Similar problems can occur when a pico UE associated with a pico cell is in the range expansion area of the pico cell. As in the PBCH case, a subframe offset can avoid the problem of overlapping PSS and SSS transmissions between different cells on a frequency. However, a subframe offset cannot be applied in TDD systems, due to rigidly defined patterns of subframes that are used for uplink and downlink transmissions.

Several embodiments are described to address the problems described above.

Figure 6A:
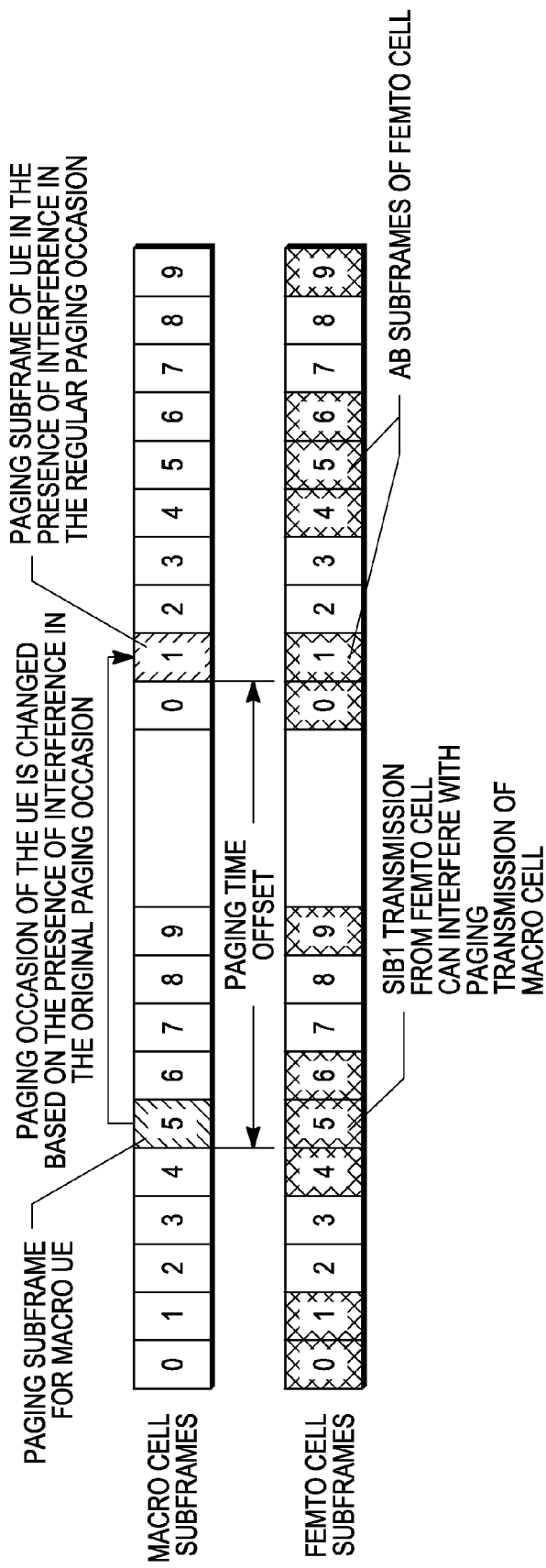
FIG. 6A illustrates changing paging occasion to avoid interference.

According to a first embodiment of the invention, illustrated in FIG. 6, the paging occasion of a UE can be changed if the UE experiences significant interference in the normal paging occasion. For example, a UE can have a paging occasion in a first subframe. The subframe that corresponds to the paging occasion is typically predetermined. For example, in LTE the subframe corresponding to the paging occasion is determined as a function of an identifier or the UE. The UE may be camped on a macro cell but be in the coverage of a non-allowed femto cell. In such a situation, the UE may experience interference during its normal paging occasion due to transmissions from the femto cell, and be unable to receive paging messages. Upon determining that it can experience interference during its paging occasion, the UE can change its paging occasion to a new subframe. The new subframe for the paging occasion can be a predetermined time offset later than the subframe corresponding to the normal paging occasion. The new subframe for the paging occasion can be chosen so that the likelihood of experiencing interference from the femto cell in the new subframe is low. This is illustrated in FIG. 6A.

Figure 6B:
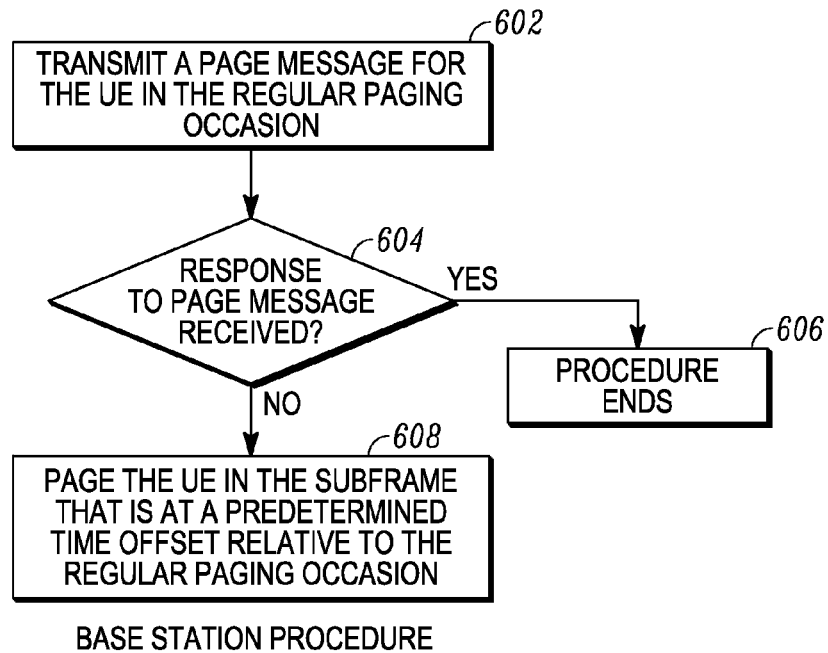
FIG. 6B is a paging offset determination process in a base station.
Figure 6C:
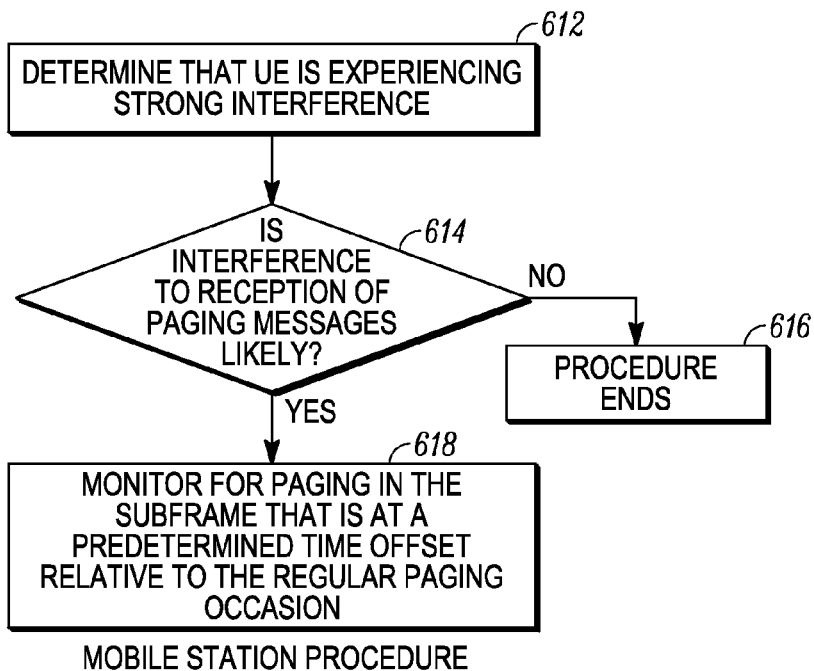
FIG. 6C is a paging offset determination process in a UE.

In the base station process of FIG. 6B, at 602, the base station transmits a paging message for the UE in the regular paging occasion. At 604, if a response to the paging message is received by the bas station, the procedure ends at 606. If no response is received, then at 608 the base station pages the UE in the subframe that is a determined time offset relative to the regular paging occasion. In the UE process of FIG. 6C, at 612, the UE determines that it is experiencing strong interference. At 614, the UE determines whether interference to reception of paging messages is likely. If not, the procedure ends at 616. If interference of the reception of paging messages is likely, at 618, the UE monitors for paging in the a subframe that is at a predetermined time offset relative to the regular paging occasion.

Upon determining that a page message needs to be transmitted to the UE, the base station can first transmit the page message in the subframe corresponding to the UE's normal paging occasion. If the base station does not receive a response to the page message from the UE, the base station can transmit the page message in the subframe corresponding to a new paging occasion. The new paging occasion can be a predetermined time offset later than the subframe corresponding to the normal paging occasion.

The determination by the UE that it can experience interference during its paging occasion can be performed by determining that its paging occasion coincides with a subframe during which a signal that can interfere, such as SIB1 may be transmitted. Alternatively, the UE can perform measurements during its paging subframe and determine that the interference during the paging subframe is unacceptably high.

Furthermore, the choice of the new paging occasion can be such that a subframe with specific characteristics is chosen for the new paging occasion. For example, a macro UE may be associated with a macro cell whose coverage overlaps the coverage of one or more femto cells. The macro UE can be configured to choose a new paging subframe that is at least a predetermined time offset later than the normal paging occasion, and corresponds to the first AB subframe of the femto cell after the predetermined time offset, if the macro UE is in the coverage of a non-allowed femto cell. In another example, the macro UE can be configured to choose a new paging subframe that is at least a predetermined time offset later than the normal paging occasion, and corresponds to the first AB subframe of the femto cell after the predetermined time offset, wherein the femto cell does not transmit SIB1 in the first AB subframe of the femto cell, if the macro UE is in the coverage of a non-allowed femto cell. Based on the rule specified, the macro cell can uniquely determine the new paging occasion of the UE.

Furthermore, UEs that are implemented according to a legacy specification (such as LTE Release 8 and Release 9 UEs) can be paged on the normal paging occasions. On the other hand, UEs that are implemented according to a newer specification (such as LTE Release 10 UEs) can be paged on both their normal paging occasions and the new paging occasions. Furthermore, in order to ensure that interference to the paging signals are minimized, the new paging occasion can correspond to an AB subframe of one or more neighbor cells. If a UE determines that its original paging occasion coincides with subframe 5 of an interfering cell, and it determines that the new paging occasion coincides with a CRS-only AB subframe, it may decide to change its paging occasion to the new paging occasion.

According to another embodiment, a UE can avoid a paging outage scenario if interference to its paging signal is very likely. For example, a macro UE may be associated with a macro cell and be in the coverage of a non-allowed femto cell. If the UE determines that its paging occasion overlaps, all or most of the time, a signal from the femto cell, the UE can perform an inter-frequency or inter-RAT reselection. Specifically, in LTE, if the paging occasion of the UE overlaps a subframe 5 in an even numbered radio frame of the femto cell, any paging signal from the macro cell to the UE will be interfered by SIB1 transmissions from the femto cell. Consequently, the UE can perform an inter-frequency or inter-RAT reselection if the paging occasion of the UE overlaps a subframe 5 in an even numbered radio frame of the femto cell. As a further simplification, and to ensure that the UE does not need to first determine the system frame number of radio frames of the femto cell, the UE can perform an inter-frequency or inter-RAT reselection if the paging occasion of the UE overlaps any subframe 5 of the femto cell.

According to another embodiment, the interference caused by an interfering cell to the paging signals can be substantially reduced by adjusting the number of symbols used for the control channel transmissions. The interference to the PDCCH component of the paging signal may be more significant than the interference to the PDSCH component of the paging signal. Furthermore, the interference to the PDCCH component of the paging signal is likely to be from the PDCCH component of another signal, such as SIB1. In LTE the number of control channel symbols can be semi-statically configured to 1, 2 or 3. In the presence of interfering neighbor cells, a cell can always use a value of 3 for the number of control channel symbols in paging subframes that can experience interference. That is, the semi-statically configured value of the number of control channel symbols can be overridden for paging subframes that can experience interference, and a value of 3 can be used. Using the largest possible number of symbols for the control channel transmissions ensures that the interference to the control channel is minimized. For example, a macro UE may be in the coverage of a non-allowed femto cell and be associated with a macro cell. The UE may experience interference from the femto cell during its paging subframe. The macro cell can override the semi-statically configured value of the number of control channel symbols and use a value of 3 for the number of control channel symbols in some or all of the paging subframe. The femto cell can use a value of 1 for the number of control channel symbols in the subframes that correspond to the paging subframe of the macro cell. The number of control channel symbols is a function of the load in the cell. Femto cells are generally lightly loaded and a smaller number of control channel symbols may be adequate for control channel transmissions in a femto cell. Thus, the interference experienced by the UE in the PDCCH component of the paging signal is restricted to a single subframe, increasing the likelihood of correctly decoding the PDCCH component of the paging signal. Furthermore, the femto cell can use a low value of the number of control channel symbols in all subframes, based on the coverage of the femto cell overlapping the coverage of a macro cell.

In some embodiments, details of the new paging occasion can be broadcasted by the network as part of system information. System information is typically signaled in the MIB or one of the SIBs. Details of the new paging occasion can comprise a frame index or sub frame index or a system frame number. In embodiments where the new paging occasion is using a time offset later than the subframe corresponding to the normal paging occasion, the time offset value can also be broadcasted by the network. In some embodiments, the specific PDSCH resource allocation (resource block indices, Modulation and coding scheme) for the paging message in the new paging location can also be broadcasted by the network. Alternately, the specific PDSCH resource allocation for the paging message in the new paging location can be based on pre-specified values known a priori to the base station and the UE. In embodiments where the specific resource allocation for the paging message in the new paging location is either broadcasted or known a priori, the UE can read the paging message directly on the PDSCH without decoding PDCCH in the new paging location.

The UE can receive the PDCCH component of the paging signal in a first subframe. The UE may be unable to decode the PDSCH component of the paging signal in the first subframe. The UE can the attempt to decode the PDSCH component of the paging signal in a second subframe, without attempting to receive a PDCCH component of the paging signal in the second subframe. For example, the first subframe can have little or no interference in the symbols used for control channel transmissions, but can have significant interference in the symbols used for PDSCH transmissions. Thus, the UE may successfully decode the PDCCH component of the paging signal, but be unable to decode the PDSCH component of the paging signal, in the first subframe. If the UE is unable to decode the PDSCH component of the paging signal in the first subframe, it can monitor the second subframe for the PDSCH component of the paging signal. The second subframe can overlap an AB subframe of a neighbor cell. Alternatively, the UE can experience significant interference in the symbols used for control channel transmissions in its normal paging subframe. Therefore the UE can monitor an alternate subframe for the PDCCH component of the paging channel and its normal paging subframe for the PDSCH component of the paging subframe.

According to a second embodiment, the UE can modify its cell reselection behavior based on whether overlap of resources reserved for CRS transmission can occur. In a first approach illustrated in the process 700 FIG. 7A, at 710, the UE may be camped on a macro cell but be in the coverage of a non-allowed femto cell. In such a situation, the resource elements used by the macro cell and the femto cell for their respective CRS transmissions can overlap, resulting in the UE being unable to perform correct measurements of both the macro cell and the femto cell and possibly other cells. For example, the PCID of the macro cell and the femto cell can be such that the resource elements used for their respective CRS transmissions overlap. At 720, the UE determines whether the CRS transmissions of the macro cell and the femto cell can overlap. This determination can be done by (a) first detecting the PCID of the femto cell, (b) then, based on the PCID, determining the resource elements used for CRS transmissions of the femto cell, and (c) comparing the resource elements used for CRS transmissions of the femto cell and the resource elements used for CRS transmissions of the macro cell.

In addition to the PCID, information pertaining to the number of CRS transmission ports in the neighbor cell and the serving cell can be used. The UE can determine the number of CRS transmission ports of the serving cell based on PBCH decoding. On the other hand, the number of CRS transmission ports for the neighbor cell can be determined based on either neighbor cell PBCH decoding or by means of assistance data signaled by the serving cell that includes this information. When the number of CRS transmission ports for the serving and neighbor cells are different, different situations may arise.

When both serving cell and neighbor cell use 1 Tx, CRS collision occurs when $\mod(PCID_{serving}, 6) = \mod(PCID_{neighbor}, 6)$.

When both the serving cell and the neighbor cell have 2 Tx, CRS collision occurs when $\mod(PCID_{serving}, 3) = \mod(PCID_{neighbor}, 3)$.

When the serving cell has 4 Tx and neighbor cell has 2 Tx, CRS ports #2 and #3 for the serving cell will not experience any CRS interference from the neighbor cells as ports #0 and #1 are mapped to a different set of OFDM symbols relative to ports #2 and #3.

Two reselection thresholds may be configured in the UE by the network (e.g., by signaling in SIB or in a RRC message as part of RRC connection release), one applicable to the case when the CRS transmissions of a femto cell overlaps the CRS transmissions of a macro cell, and another applicable to the case when the CRS transmissions of the femto cell does not overlap the CRS transmissions of the macro cell. A macro UE with CRS Interference Cancellation (IC) or Interference Rejection (IR) receiver capabilities may be able to stay on the same frequency even when the interference from the femto cell is large, if there is no CRS collision. The UE may be able to remain attached to and remain schedulable by the macro cell even when the RSRP difference between the serving cell and the neighbor cell is as low as, say, −20 dB. However, CRS interference rejection/cancellation capabilities may be limited when there is CRS collision. The UE may be able to remain attached to the macro cell only up to, say, −6 dB in this case. Therefore, different reselection thresholds matched to the receiver capabilities in the non-colliding and colliding CRS cases may be necessary.

Figure 7A:
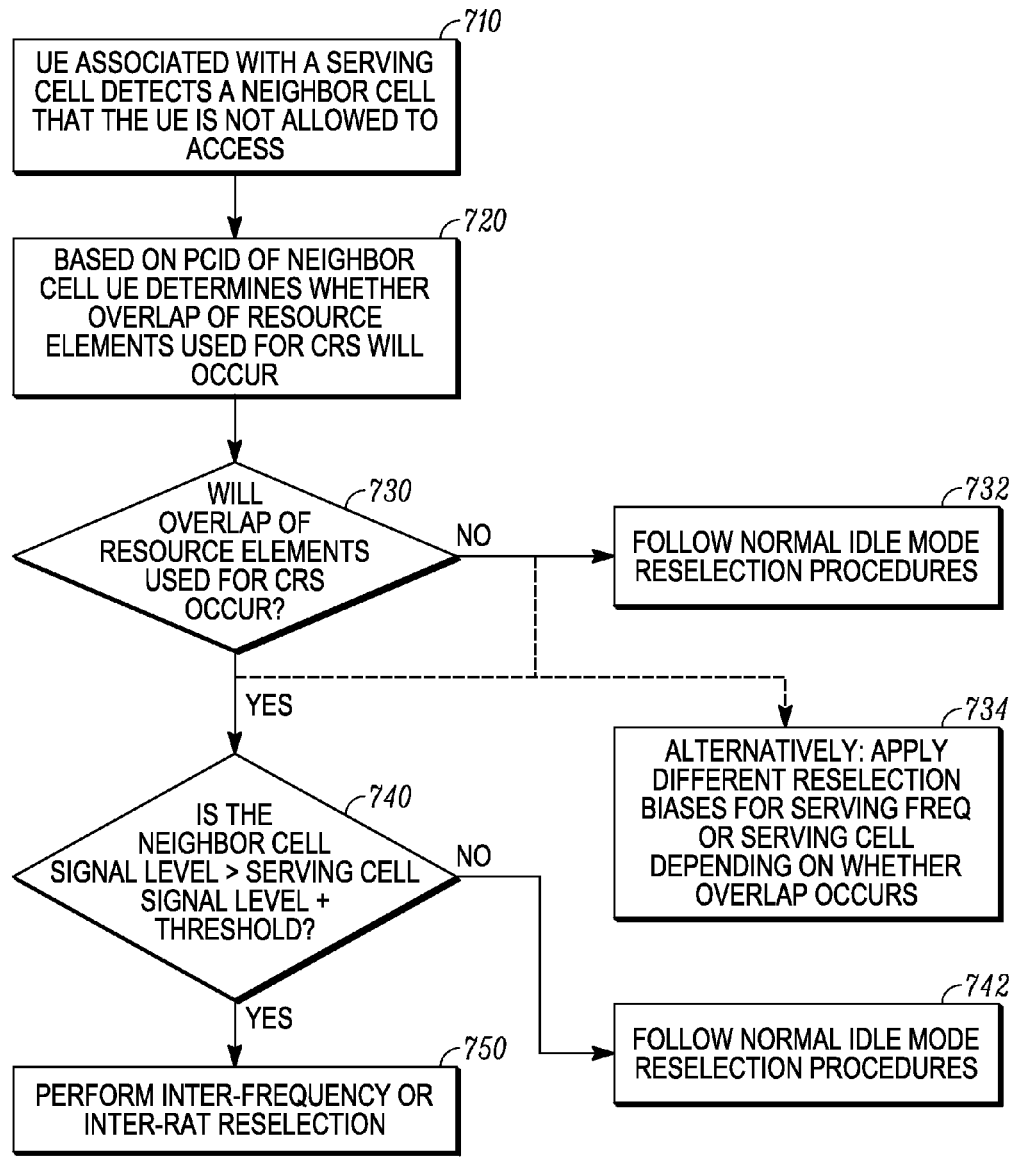
FIG. 7A illustrates a first embodiment that overcomes problems related to overlap or collision of cell-specific reference symbols of different cells in a heterogeneous network.

In FIG. 7A, at decision block 730, if there is no overlap of resource elements used for CRS, then the UE follows normal idle mode relesction procedures. If overlap occurs, at 740 the UE determines whether the neighbor cell signal level is greater than the serving cell signal level plus a threshold. At 742, if the neighbor cell signal level is not greater than the serving cell signal level plus a threshold, the UE follows normal idle mode reselection procedures. At 750, if the neighbor cell signal level is greater than the serving cell signal level plus the threshold, the UE performs inter-frequency or inter-RAT reselection.

If the UE determines that the resource elements used for the CRS transmissions of the macro cell and the femto cell overlap, it can perform an inter-frequency reselection or an inter-RAT reselection. According to a further embodiment, the UE can perform the inter-frequency or inter-RAT reselection only if a signal level of the femto cell is no less than a signal level of the macro cell plus a threshold. The signal level metric used to determine whether the signal level of the femto cell is no less than the signal level of the macro cell plus a threshold can be obtained by measurements of resources other than the CRS.

According to another embodiment illustrated in FIG. 7A at 734 the UE applies different reselection biases for the serving frequency or serving cell based on whether overlap occurs. In one implementation, if the UE determines that the resource elements used for the CRS transmissions of the macro cell and the femto cell overlap, it can apply a negative bias to the serving frequency. The negative bias can result in cells on another frequency or another RAT being viewed by the UE as suitable candidates for reselection, and the UE can perform a inter-frequency or inter-RAT reselection. If the UE determines that the resource elements used for the CRS transmissions of the macro cell and the femto cell do not overlap, it can apply a positive bias to the serving frequency. The positive bias can ensure that the UE remains camped on the macro cell even if a signal level of the femto cell (such as RSRP) is higher than that of the macro cell. Additionally, or alternatively, the UE can apply a negative bias to the serving cell if the UE determines that the CRS transmissions of the macro cell and the femto cell overlap substantially. The UE can apply a positive bias to the serving cell if the UE determines that the CRS transmissions of the macro cell and the femto cell do not overlap substantially.

Figure 7B:
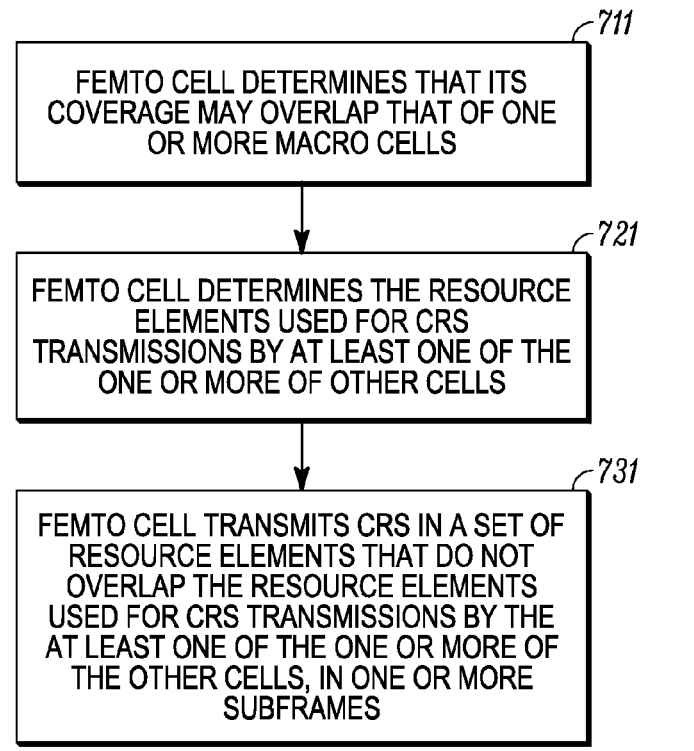
FIG. 7B illustrates a second embodiment that overcomes problems related to overlap or collision of cell-specific reference symbols of different cells in a heterogeneous network.
Figure 7B:
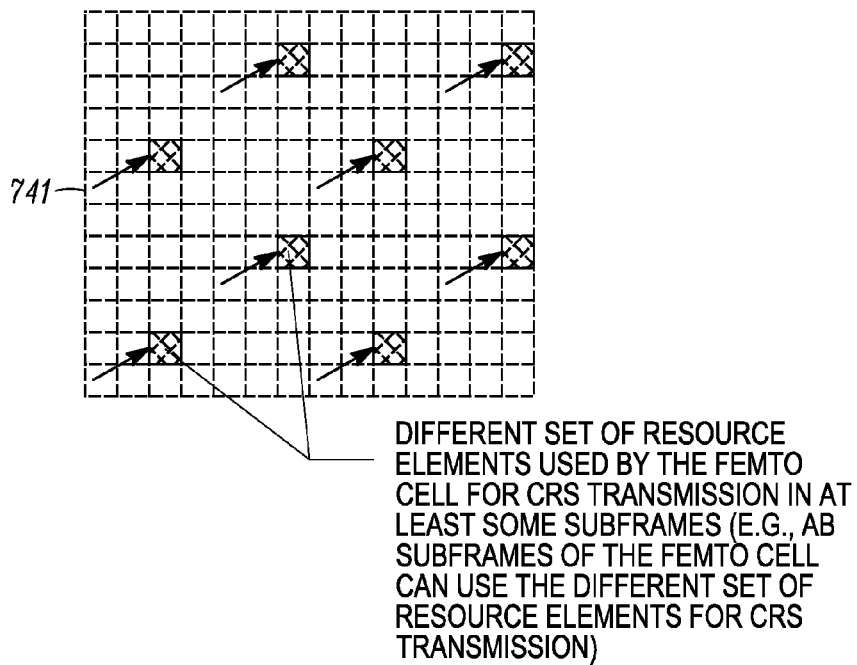

In a second approach illustrated in the process 701 of FIG. 7B, at 711, a femto cell can determine that its coverage overlaps the coverage of one or more neighbor cells. At 721, the femto cell can determine the resource elements used by the one or more neighbor cells. At 731, if the femto cell determines that the resource elements used for CRS transmissions by at least one of the one or more neighbor cells overlaps the resource elements used for the femto cell's CRS transmissions, the femto cell can use a different set of resource elements for its CRS transmissions. The femto cell can use the different set of resource elements for its CRS transmissions in some or all subframes. For example, 741, the femto cell can use the different set of resource elements for its CRS transmissions only during its AB subframes. Additionally, the different set of resource elements for the femto cell's CRS transmissions can be obtained by applying offsets in time and frequency to the original resource elements, as shown in FIG. 7. The offsets in time and frequency can be signaled to UEs in the network, for example by macro cells.

According to another embodiment, a femto cell can modify access restrictions based on whether its CRS transmissions substantially overlap the CRS transmissions of a macro cell. For example, a femto cell may be a CSG cell and allow access only to a certain group of users. The femto cell can determine that its coverage may overlap one or more macro cells. The femto cell can further determine that the resource elements it uses for transmissions of CRS can substantially overlap the resource elements used for CRS transmissions by at least one of the one or more macro cells. The femto cell can then modify access restrictions such that all users can access the femto cell. The modifying of access restrictions can ensure that a UE does not remain in the coverage of the femto cell without being able to connect to the femto cell. That is, if all femto cells in the network perform such a procedure, UEs do not encounter non-allowed femto cells whose CRS transmissions overlap the CRS transmissions of macro cells. The modification of access restrictions can be performed by changing the status of the femto cell from a CSG cell to a "hybrid access" cell or "open access" cell.

Figure 8A:
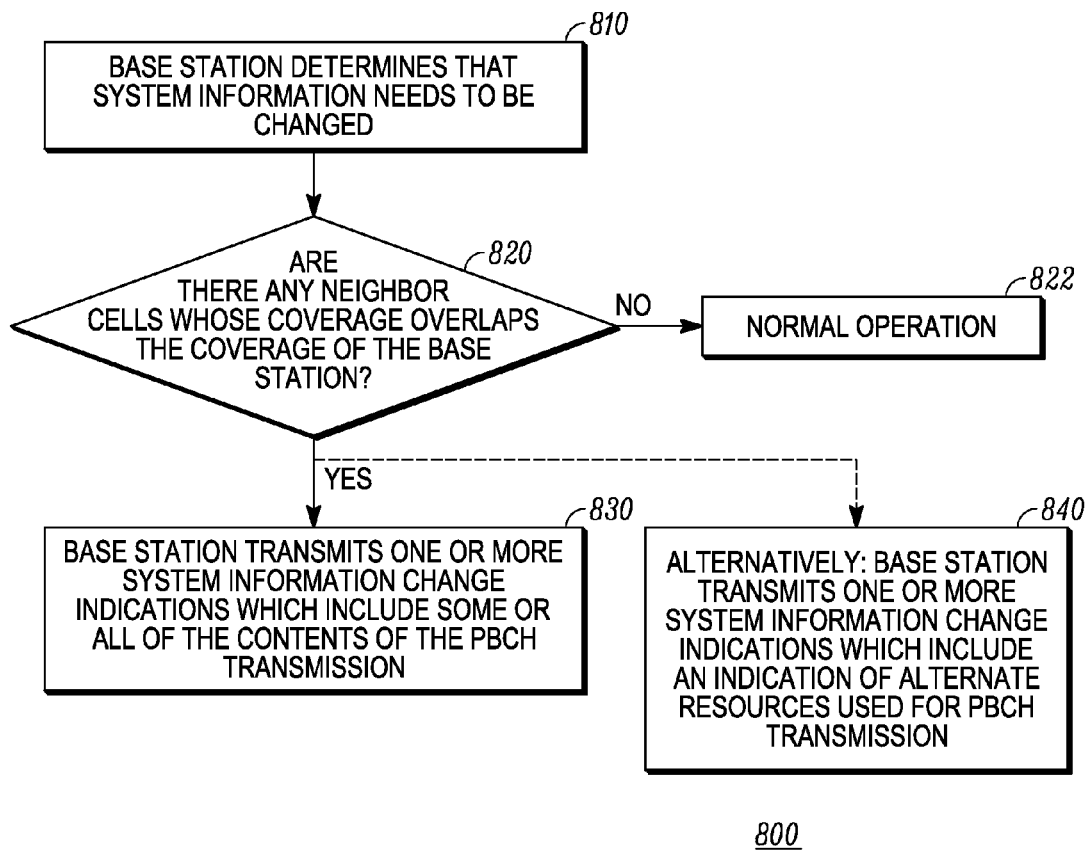
FIG. 8A illustrates a first embodiment that overcomes problems related to overlap or collision of physical broadcast channels of different cells in a heterogeneous network.

According to a third embodiment, a base station can use alternate resources to transmit PBCH contents or PBCH related information. The alternate resources used to transmit PBCH contents can be predetermined so that UEs can receive the PBCH contents or the PBCH related information in these resources. In a first approach illustrated in FIG. 8A, at 810, a base station determines that its system information needs to be changed. At 820, the base station determines whether its coverage overlaps the coverage of one or more neighbor cells, such as femto cells. If not, at 822, the base station resumes normal operation. At 830, in the presence of overlap, the base station transmits a system information change indication message, wherein the message includes the PBCH contents. UEs that are associated with the base station (in connected mode or idle mode) and are in the coverage of non-allowed femto cells can receive the system information change indication message and the included PBCH contents. This can enable the UEs to receive other system information such as system information block 1 (SIB1). Alternatively, at 840, the base station can transmit a system information indication message, wherein the message includes an indication of alternate resources uses for PBCH transmission. UEs that are associated with the base station (in connected mode or idle mode) and are in the coverage of non-allowed femto cells can receive the system information change indication message and the indication of alternate resources for PBCH transmission. The UEs can then decode the PBCH in the alternate resources. This can enable the UEs to receive other system information.

The PBCH contents transmitted in the paging message can include one or more of the information elements in the MIB. For example, the paging message can include one or more of the downlink bandwidth, information related to the system frame number and information related to the physical HARQ indicator channel (PHICH).

Figure 8B:
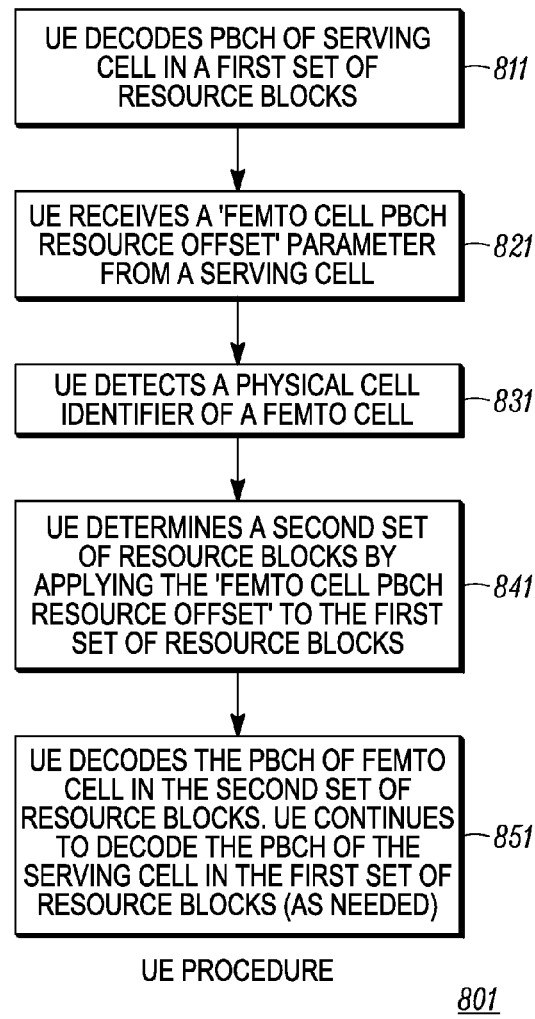
FIG. 8B illustrates a second embodiment that overcomes problems related to overlap or collision of physical broadcast channels of different cells in a heterogeneous network from the UE perspective.
Figure 8C:
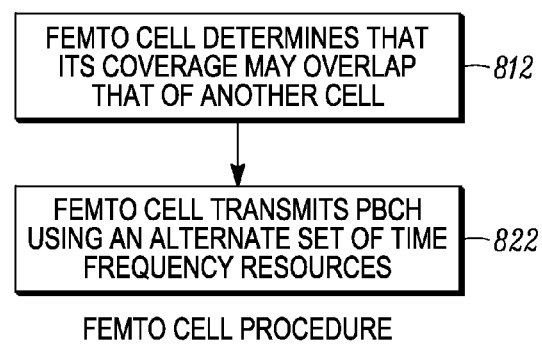
FIG. 8C illustrates a second embodiment that overcomes problems related to overlap or collision of physical broadcast channels of different cells in a heterogeneous network from the femto cell perspective.

According to another embodiment, the UE can receive the PBCH of a macro cell and a femto cell by transmitting the PBCH of the femto cell in alternate resource blocks in a predetermined manner. For example, a macro UE may be associated with a macro cell. In a second approach illustrated in the process 801 of FIG. 8B, at 811, the UE decodes the PBCH of the macro cell in a first set of resource blocks of the macro cell. The UE can receive additional system information of the macro cell after decoding the PBCH. At 821, the UE receives a 'Femto cell PBCH resource offset' parameter from the macro cell. At 831, the UE detects a physical cell identifier of a femto cell. The UE then roam into the coverage of a femto cell and detect the PCID of the femto cell. At 841, the UE determines a second set of resource blocks by applying an offset equal to the 'Femto cell PBCH resource offset' to the first set of resource blocks. At 851, the UE attempts to decode the PBCH of the femto cell in the resource blocks of the femto cell that overlap the second set of resource blocks. The UE can continue to decode the PBCH of the macro cell in the first set of resource blocks as needed.

The femto cell may be configured to transmit its PBCH using a normal set of resource blocks. In process 802 of FIG.

8C, at 811, the femto cell determines that its coverage may overlap the coverage of a macro cell. At 822, the femto cell transmits its PBCH in an alternate set of resource blocks. The alternate set of resource blocks can be offset from the normal set of resource blocks by an amount equal to the 'Femto cell PBCH resource offset'. It should be noted that the procedure can be applied to any combinations of cells instead of the macro cell and femto cell combination described above. The macro cell can indicate a PBCH resource offset for any specific cell or set of cells (for example as part of a neighbor list). When a PCID of a neighbor cell is detected, the UE can apply the corresponding PBCH resource offset (if indicated), to obtain the alternate resource blocks used by the neighbor cell for PBCH transmission.

In synchronous networks, interference PSS transmissions of two cells on the same frequency can interfere with each other and SSS transmissions of two cells on the same frequencies can interfere with each other. The following solutions mitigate this problem.

The PSS and/or the SSS can be transmitted using alternate resource elements. The alternate resource elements can be protected from interference. Furthermore, the PSS and/or the SSS can be transmitted using both the resource elements used normally for PSS and/or SSS transmission and the alternate resource elements. For example, a macro UE may be in the coverage of a non-allowed femto cell, and thus may be unable to receive the PSS and/or SSS of the macro cell. To overcome such a problem, the femto cell can first recognize that its coverage overlaps that of the macro cell. The femto cell can then transmit the PSS and/or the SSS in alternate resource elements. The femto cell can choose the alternate resource elements such that the alternate resource elements do not overlap some critically important transmissions from the macro cell. Furthermore, the femto cell can also ensure that some or all of the resource elements that overlap the PSS and/or the SSS transmissions of the macro cell do not carry any transmissions from the femto cell.

The alternate resource elements used for PSS and/or SSS transmissions can be offset by a time duration from the normal resource elements used for PSS and/or SSS transmissions. Preferentially, the offset can be a certain number of subframes. That is, the PSS and/or SSS can be transmitted in alternate subframes but in the same OFDM symbol. For example, the PSS may normally be transmitted in the $3^{rd}$ symbol of subframe 1 and the $3^{rd}$ symbol of subframe 6; and the SSS may normally be transmitted in the 13th symbol in subframe 1 and the 13th symbol in subframe 6. The femto cell can instead transmit the PSS in the $3^{rd}$ symbol of subframe 3 and the $3^{rd}$ symbol of subframe 8.

A UE that receives the PSS and/or SSS from the femto cell may be unaware that the femto cell is using alternate resources for PSS and/or SSS transmissions. Hence the UE can interpret the frame timing of the femto cell assuming the PSS and/or SSS are being transmitted in the normal resource elements. Such a UE may be either a macro UE that is in the coverage of the femto cell, a associated with the femto cell, or a UE attempting to associate with the femto cell. Thus, in the above example, such a UE can assume that the subframes in which the PSS transmissions are received are subframe 1 and 6, and the subframes in which the SSS transmissions are received are subframe 1 and 6. The UE will then be unable to decode the PBCH or critical transmissions such as SIB1, paging etc from the femto cell. In order to prevent such problems, the time duration offsets used for the PSS and the SSS can be made known to the UE apriori. For example, a macro cell can signal the time duration offset to the UEs. The time duration offset can also be a fixed value for a class of cells (such as femto cells or CSG cells) and may not need to be signaled. The UEs can use the time duration offset to correct their interpretation of the frame boundary of the femto cell. Thus, in the above example, a time duration offset equal to two subframes, for the femto cell, is made known apriori to the UE. Based on this interpretation, the UE can determine that the subframes in which the PSS transmissions are performed by the femto cell are subframes 3 and 8, and the subframes in which the SSS transmissions are performed by the UE are subframes 3 and 8. Thus, the functions and apparatus in the UE related to PSS/SSS reception (such as cell search) can have a first interpretation of the frame timing; and the other functions and apparatus in the UE (for example, other physical layer functions, medium access control functions and measurements related functions) can have a second interpretation of frame timing. The second interpretation of frame timing can be an offset by a time period from the first interpretation of frame timing. Furthermore, it should be noted that such an approach can be used to avoid overlap of PBCH transmissions of neighbor cells.

According to another embodiment, if a macro UE determines that PSS and/or SSS of a non-allowed femto cell overlaps the PSS and/or SSS transmissions of a serving macro cell, the UE can perform an inter-frequency or inter-RAT reselection. Thus, the UE can remain associated with the macro cell even if the non-allowed femto is a strong interfering cell, unless the PSS and/or SSS transmission of the serving macro cell overlap the PSS and/or SSS transmissions of the non-allowed femto cell. Similarly, a pico UE in the range expansion area of the pico cell may experience high P/S-SCH interference due to interference from a macro cell. Such a UE can perform inter-frequency or inter-RAT reselection if the PSS and/or SSS of the macro cell and the pico cell overlap.

According to another embodiment, a UE can recognize its proximity to a femto cell and determine that it needs to attempt reception of PSS and/or SSS in alternate resource elements. For example, a UE may determine that it is close to a femto cell based on RRM measurements on the frequency. RRM measurements (such as RSRP) can indicate that the UE is close to the femto cell. The UE can also determine that the coverage of the femto cell overlaps the coverage of a macro cell. The UE can then attempt to receive the PSS and/or SSS in the alternate resource elements. The UE can apply such a procedure when it roams into the coverage of a femto cell whose coverage overlaps that of a macro cell. The UE can also apply such a procedure when it is powered up in the coverage of a femto cell. Other means of recognizing proximity to a femto cell can be used, including positioning methods such as global positioning system (GPS) and Enhanced observed time difference (E-OTD).

In the foregoing specification, specific embodiments of the present invention have been described. However, one of ordinary skill in the art will appreciate that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as critical, required, or essential features or elements of any or all the claims. The invention is defined solely by the appended claims including any amendments made during the pendency of this application and all equivalents of those claims as issued.

We claim:

1. A mobile station comprising:
a wireless transceiver coupled to a processor,
the processor configured to determine that frequency resources used for transmission of a signal from a serving macro cell, with which the mobile station is associated on a first frequency of a first radio access technology (RAT), substantially overlap frequency resources used for transmission of a signal from a femto cell operating on the first frequency, and
the processor configured to associate the mobile station with a third cell operating on a second frequency of the first RAT in response to determining that frequency resources used for transmission of a signal from the serving macro cell, with which the mobile station is associated on a first frequency, substantially overlap frequency resources used for transmission of a signal from the femto cell operating on the first frequency.

2. The mobile station according to claim 1, the processor configured to associate the mobile station with the third cell operating on the second frequency by reselecting to the third cell operating on the second frequency.

3. The mobile station according to claim 1, the processor configured to associate the mobile station with the third cell operating on the second frequency if a signal level of the serving macro cell is below a first threshold.

4. The mobile station according to claim 3, wherein the first threshold is signaled to the mobile station.

5. The mobile station according to claim 1
the processor configured to determine that the time frequency resources used for transmission of the signal from the serving macro cell do not substantially overlap the time frequency resources used for transmission of the signal from the femto cell operating on the first frequency; and
the processor configured to associate the mobile station with the third cell operating on the second frequency if a signal level of the serving macro cell is below a second threshold.

6. The mobile station according to claim 1, wherein the signal of the serving macro cell is a reference signal and the signal of the femto cell is a reference signal.

7. A method carried out by a mobile station comprising:
determining that frequency resources used for transmission of a signal from a serving macro cell via a first radio access technology (RAT), with which the mobile station is associated on a first frequency, substantially overlap frequency resources used for transmission of a signal from a femto cell operating on the first frequency, and
associating the mobile station with a third cell operating on a second frequency of the first RAT in response to determining that time frequency resources used for transmission of a signal from the serving macro cell, with which the mobile station is associated on a first frequency, substantially overlap frequency resources used for transmission of a signal from the femto cell operating on the first frequency.

8. The method of claim 7 comprising associating with the third cell operating on the second frequency by reselecting to the third cell operating on the second frequency.

9. The method of claim 7 comprising associating with the third cell operating on the second frequency if a signal level of the serving macrocell is below a first threshold.

10. The method of claim 9 wherein the first threshold is signaled to the mobile station.

11. The method of claim 7 comprising:
determining that the time frequency resources used for transmission of the signal from the serving macro cell do not substantially overlap the time frequency resources used for transmission of the signal from the femto cell operating on the first frequency; and
associating the mobile station with the third cell operating on the second frequency if a signal level of the serving macro cell is below a second threshold.

12. The method of 7, wherein the signal of the serving macro cell is a reference signal and the signal of the second cell is a reference signal.

* * * * *